March 1, 1960      M. E. ENRIGHT      2,926,927
TWO WHEELED COASTER VEHICLE FOR TRANSPORTING GOLF CLUBS
Filed Aug. 26, 1958      2 Sheets-Sheet 1
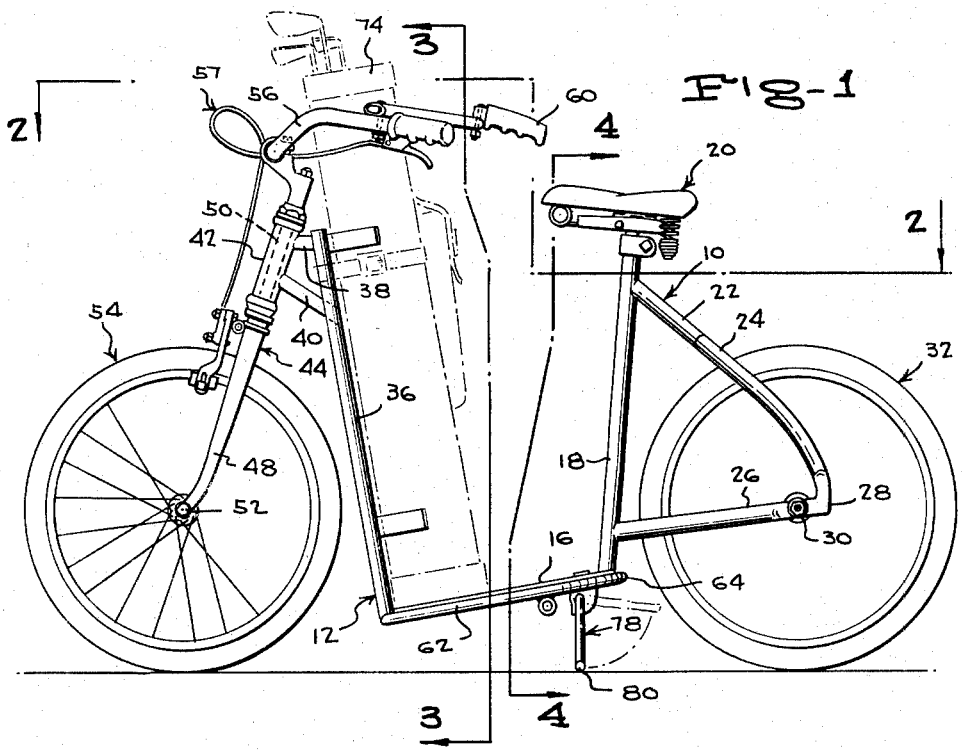
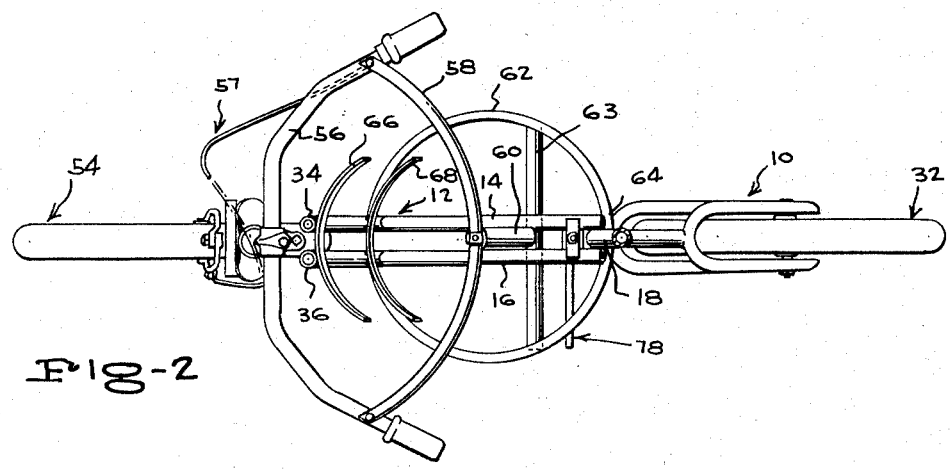
INVENTOR.
MARION E. ENRIGHT
BY
McMorrow, Berman & Davidson
ATTORNEYS

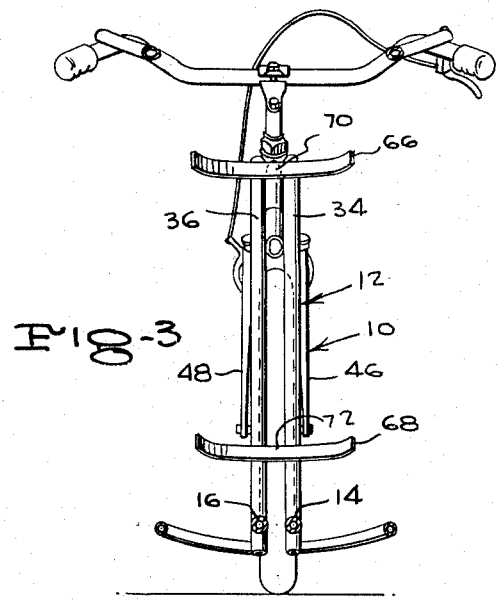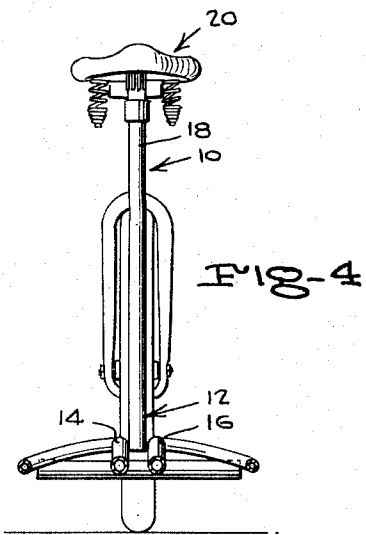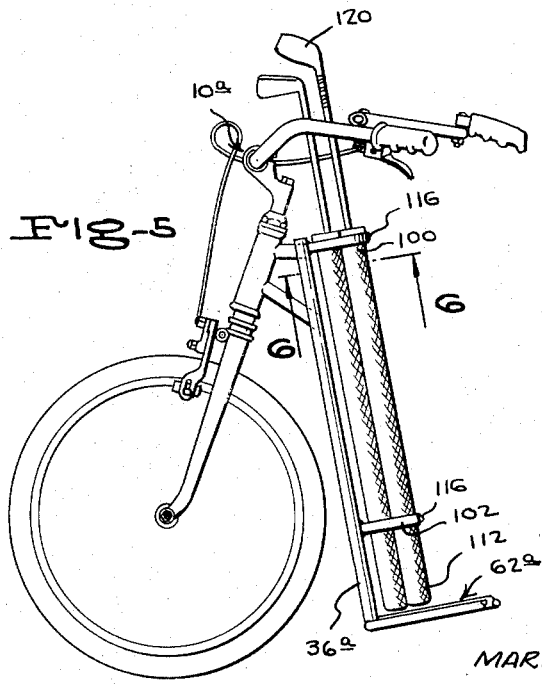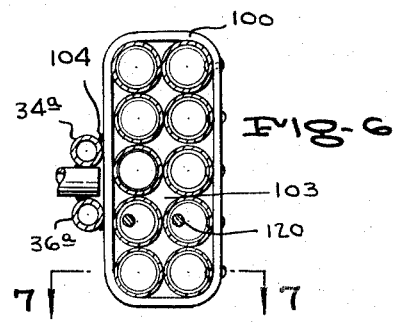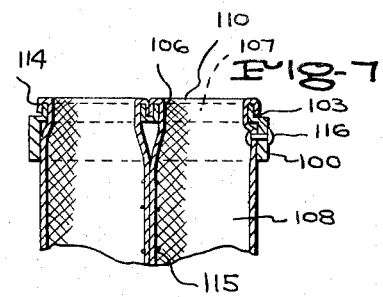

United States Patent Office 2,926,927
Patented Mar. 1, 1960

2,926,927

TWO WHEELED COASTER VEHICLE FOR TRANSPORTING GOLF CLUBS

Marion E. Enright, Dallas, Tex.

Application August 26, 1958, Serial No. 757,397

4 Claims. (Cl. 280—87.02)

This invention pertains generally to land vehicles, and more specifically, to vehicles provided with means for transporting golf clubs, or the like.

Among the important objects and advantages of the present invention is the provision of a vehicle for transporting a golf bag and/or golf clubs, the vehicle being of novel and improved construction and assembly over previouly known carts and the like used for this purpose.

Another object resides in the provision of a vehicle of this general class which is further capable of transporting a person.

Still another object is the provision of a vehicle having a main frame, and the frame being provided with carriage means for supporting a golf bag and/or golf clubs.

A further object of this invention resides in the provision of a vehicle of the class described, supra, the vehicle being noncomplex in construction and assembly, inexpensive to manufacture and durable in use.

Other and further objects and advantages will become more readily apparent from a consideration of the following specification when read in conjunction with the annexed drawings, in which:

Figure 1 is a side elevational view of one form of vehicle constructed and assembled in accordance with the teachings of this invention, the view including a phantom line illustration of a golf bag supported thereon;

Figure 2 is a top plan view of the vehicle of Figure 1, having the seat assembly thereof removed, Figure 2 being taken along section line 2—2 of Figure 1;

Figure 3 is a detail cross sectional view of the vehicle, partly in elevation, the section being taken substantially along the section line 3—3 of Figure 1, looking in the direction of the arrows;

Figure 4 is a detail cross sectional view, partly in elevation, taken substantially along the plane of the section line 4—4 of Figure 1, looking in the direction of the arrows;

Figure 5 is a fragmentary side elevational view of a modified form of the present invention;

Figure 6 is an enlarged detail cross sectional view of the golf club carriage means of the form of the invention seen in Figure 5, the section being taken substantially along the inclined plane of section line 6—6 of Figure 5, looking in the direction of the arrows; and Figure 7 is an enlarged fragmentary cross sectional view of the upper end of the aforesaid carriage means taken along the line 7—7 of Figure 6, looking in the direction of the arrows.

Referring now to the accompanying drawings in more exact detail, and especially to Figures 1 through 4, inclusive, thereof, general reference numeral 10 has been applied to designate a vehicle constructed and assembled in accordance with the present invention. In the illustration here presented, it is seen that the vehicle 10 has been supplied with two wheels. However, it is obvious that the number of wheels could be varied to include any number without departing from the spirit and scope of this invention.

The vehicle 10 includes a main frame 12 having a pair of laterally spaced, elongated, and substantially parallel base members 14, 16, and an upright seat-supporting standard 18, one end of the standard 18 being secured between the base members by welds, as shown in Figure 2. The other end of the standard 18 is seen to have a riding seat 20 affixed thereto by any suitable means, in order to allow a person to straddle same and ride the vehicle.

The end of the standard 18 having the seat 20 affixed thereto is also provided with a tubular brace 22 which extends outwardly and downwardly therefrom. The brace 22 has a bifucated outer end 24 which projects laterally and downwardly relative to the standard 18, and the bifurcated portion 24 has a reverted portion 26 forming a corner 28 and is fixedly connected to the standard 18 adjacent the opposed end thereof. A suitably mounted axle 30 is supported on the reverted portion 26 adjacent the corner 28 and a wheel 32 of conventional design is rotatably mounted on the aforeside axle 30 between the bifurcated and reverted portions of the brace 22.

Positioned at the opposed ends of the base members 14, 16, are a pair of side-by-side upright standards 34, 36, also formed of tubular metal, and fixedly secured to the base members 14, 16, respectively. A pair of tubular struts 38, 40 have one pair of their adjacent ends projecting laterally from between the upper ends of the standard 34, 36 and are fixedly secured thereto. The other pair of ends of the aforesaid struts are fixedly secured to a journal member 42, and the journal has an inverted, substantially Y-shaped yoke 44 mounted therein including laterally spaced arms 46, 48 depending from a substantially cylindrical stem 50, the stem 50 being rotatably mounted in the journal 42. An axle 52 is conventionally supported between the lower ends of the arms 46, 48, and a wheel 54 is rotatably mounted thereon.

As best seen in Figure 1, the outer end of the stem 50 projects upwardly above the journal 42 and a handle bar 56 is fixedly connected thereto at a point intermediate its opposed ends. A hand brake assembly 57 of conventional deign is secured to the handle bar and engages the wheel 54 through the usual linkage means. An arcuate member 58 has its opposed ends secured to the handle bar 56 adjacent its outer ends. Figures 1 and 2 illustrate the mounting of a handle member 60 which is centrally secured to the arcuate member 58, the purpose of this handle member becoming more apparent below.

A split ring 62, also formed of substantially tubular metallic stock, and including a bight portion 64, is rigidly secured to the base members 14, 16 at the junction of the ends of said bases with the bight 64. As is obvious from Figure 1, the split ring 62 is substantially parallel relative to the base members 14, 16, and a tubular foot-supporting reinforcing member 63 is connected thereto.

Standards 34, 36 are provided with a plurality of vertically spaced, arcuate golf bag-embracing members 66, 68 having their respective bight portions 70, 72 fixedly secured to the aforesaid standards. The nested positioning of a golf bag in the embracing members 66, 68 is seen in Figure 1, wherein the bag 74 is represented in phantom lines. Note therein that a belt type strap shown in dotted lines is employed to releasably secure the bag 74 to the standards 34, 36, and the base members 14, 16 provide subjacent support for the bag.

A bicycle-type kick stand 78 is suitably mounted adjacent the rear ends of the base members 14, 16, and has a pivotal ground-engaging arm 80, as is conventional.

In operation, the golf bag 74 is suitably positioned as hereinbefore described and illustrated and the vehicle 10 may be ridden by the user on downwardly inclined surfaces. Riding is accomplished by sitting astride the seat 20, resting the feet on the rear edges of the split ring 62 and steering with the handle bar 56, the speed of the vehicle being controlled by the hand brake 57. On level or uphill terrain, the user dismounts the vehicle and pushes it, utilizing the handle 60 and either one of the handles positioned at the outer ends of the handle bar 56 as a pushing means. It will be noted that the provision of the handle 60 obviates the necessity of reaching around the bag 74 to grasp the handles at the opposed ends of the handle bar 56. When the device is not in motion, the kick stand 78 is used to support it in its upright position by merely pivoting the arm 80 to the solid line position of Figure 1.

Figures 5 through 7, inclusive, are illustrative of a modified form of vehicle constructed and assembled within the scope of this invention. The vehicle 10a is similar to the vehicle 10 and has standards 34a, 36a, extending upwardly from the split ring 62a thereof. A pair of vertically spaced, substantially rectangular support brackets 100, 102 are fixedly secured to the standards 34a, 36a, as by welds 104, as seen in Figure 6. In Figures 7, it is seen that the bracket 100 has a separator plate 103 having a plurality of openings 10 extending transversely therethrough, the marginal edges of the openings having upwardly extending circular flanges 107. A plurality of golf club holding tubes 108 having open constricted ends 110 and opposed closed ends 112 are provided. The open ends 110 are provided with reverted portions 114 which are engageable on the circular flanges 107, as shown in Figure 7. Rivets 116, or other fastening means, are utilized to secure the outer set of the tubes 110 to the brackets 100, 102, and the outer set of tubes is affixed to the inner set thereof by studs 118, or the like.

Golf clubs 120 are individually positioned in the tubes 108 and this form of the invention is similar in assembly and operation to that described above.

Having described and illustrated two embodiments of this invention, it should be understood that the same are offered merely by way of example and that this invention is to be limited only by the scope of the appended claims.

What is claimed is:

1. A vehicle comprising a main frame including a pair of elongated horizontally spaced tubular base members, tubular seat supporting means secured to one pair of ends of said base members, a bifurcated wheel-supporting brace extending outwardly from said seat-supporting means, a seat secured to the upper end of said seat supporting means, an upright standard fixedly secured to each of said base members at the opposite ends thereof, a split ring including a bight portion, said bight portion being secured to said first-named ends of said base members and the confronting ends of said split ring being fixedly secured to said base members adjacent said opposite ends thereof, a tubular foot-supporting reinforcing member fixedly secured to said split ring and extending transversely thereacross, said upright standards having golf club support means thereon, a pair of struts secured to said standards and to a cylindrical journal member, an inverted Y-shaped yoke having a pair of laterally spaced arms depending from one end of a stem, a wheel mounted between said arms, said stem being disposed in said journal and projecting therebeyond, a handle bar connected intermediate its ends to said stem, an arcuate member having the opposed ends thereof connected adjacent the opposed ends of said handle bar, and a handle member rigidly secured to said arcuate member centrally of the ends thereof.

2. A vehicle as defined in claim 1 wherein said golf club support means include a plurality of arcuate vertically spaced bag embracing members secured to said standards, and a conventional golf bag adapted to be nested in said embracing members and supported on said base member and adapted to be secured to said standards by flexible means.

3. A bicycle club cart comprising a main frame including a pair of laterally spaced elongated and substantially parallel base members, an upright seat-supporting standard having one end thereof rigidly secured to and disposed between said base members, and a pair of adjacent ends thereof, a seat fixedly connected to the other end of said standard, a brace having an end thereof rigidly connected to said standard adjacent said other end thereof, the other end of said brace being bifurcated and projecting laterally and downwardly from said standard, said bifurcated end having a reverted portion forming a corner and connected to said standard adjacent one end thereof, an axle supported on said reverted portion of said brace adjacent said corner, a wheel rotatably supported on said axle between said bifurcated and reverted portions of said brace, an upright standard for each of said base members, means rigidly connecting a pair of adjacent ends of said last-named standards respectively, to the other adjacent ends of said base members, said last-named standards being disposed in laterally spaced, substantially parallel relation relative to each other, a pair of struts having an adjacent pair of ends fixedly secured to and projecting laterally from between the upper ends of said last-named standards, a journal fixedly connected to the other ends of said struts, an inverted Y-shaped yoke having a pair of laterally spaced arms depending from one end of a stem, an axle supported between the lower ends of said arms, a wheel rotatably mounted on said axles between said arms, said stem having its other end projecting beyond said journal, a handle bar fixedly connected intermediate its ends to said other end of said stem, an arcuate member having the opposed ends thereof connected, respectively, adjacent the opposed ends of said handle bar, a handle member rigidly secured to said arcuate member centrally of the ends thereof, a split ring having the bight portion thereof rigidly secured to said one ends of said base members and the confronting ends thereof rigidly secured, respectively, to the other end of said base member, said split ring and said base members being substantially parallel relative to each other, and a pair of vertically spaced arcuate golf bag embracing members having the bight portions thereof rigidly secured to said last-named standards, said base members being adapted to receive and support therein the lower end of a conventional golf bag.

4. A vehicle comprising a main frame including at least one elongated base member, a plurality of standards secured to and spaced longitudinally of said member, ground wheel assemblies projecting from the respective standards exteriorly of the space between the standards, seat means mounted on one of the standards and projecting therefrom into said space, a plurality of vertically spaced support brackets fixedly secured to the other standard and projecting into said space, the uppermost one of said brackets including a separator plate having a plurality of openings formed therein and extending transversely therethrough, the marginal edges of said openings being provided with upwardly extending circular flanges, a plurality of golf club holding tubes formed of flexible material, said tubes having open constricted ends and opposed closed ends, said constricted ends having reverted portions, said tubes being positioned in said openings in said plates and said reverted portions being engageable on said circular flanges, and means for securing said tubes to said brackets and to each other in said space between the standards.

References Cited in the file of this patent

UNITED STATES PATENTS

| 592,886 | Sanders | Nov. 2, 1897 |
| 1,611,307 | Forse | Dec. 21, 1926 |
| 2,406,183 | Allen | Aug. 20, 1946 |
| 2,749,997 | Deslippe | June 12, 1956 |
| 2,816,775 | Costello | Dec. 17, 1957 |
| 2,844,209 | Brunderman | July 22, 1958 |

FOREIGN PATENTS

| 915,380 | France | July 22, 1946 |